Oct. 29, 1968  A. N. DEDRICKS ETAL  3,407,621
SPRAY TYPE ICEMAKER WITH OVERFLOW DRAIN
Original Filed March 27, 1964  3 Sheets-Sheet 1

INVENTORS
ALVIN N. DEDRICKS
RICHARD H. SWANSON

BY
ATTORNEY

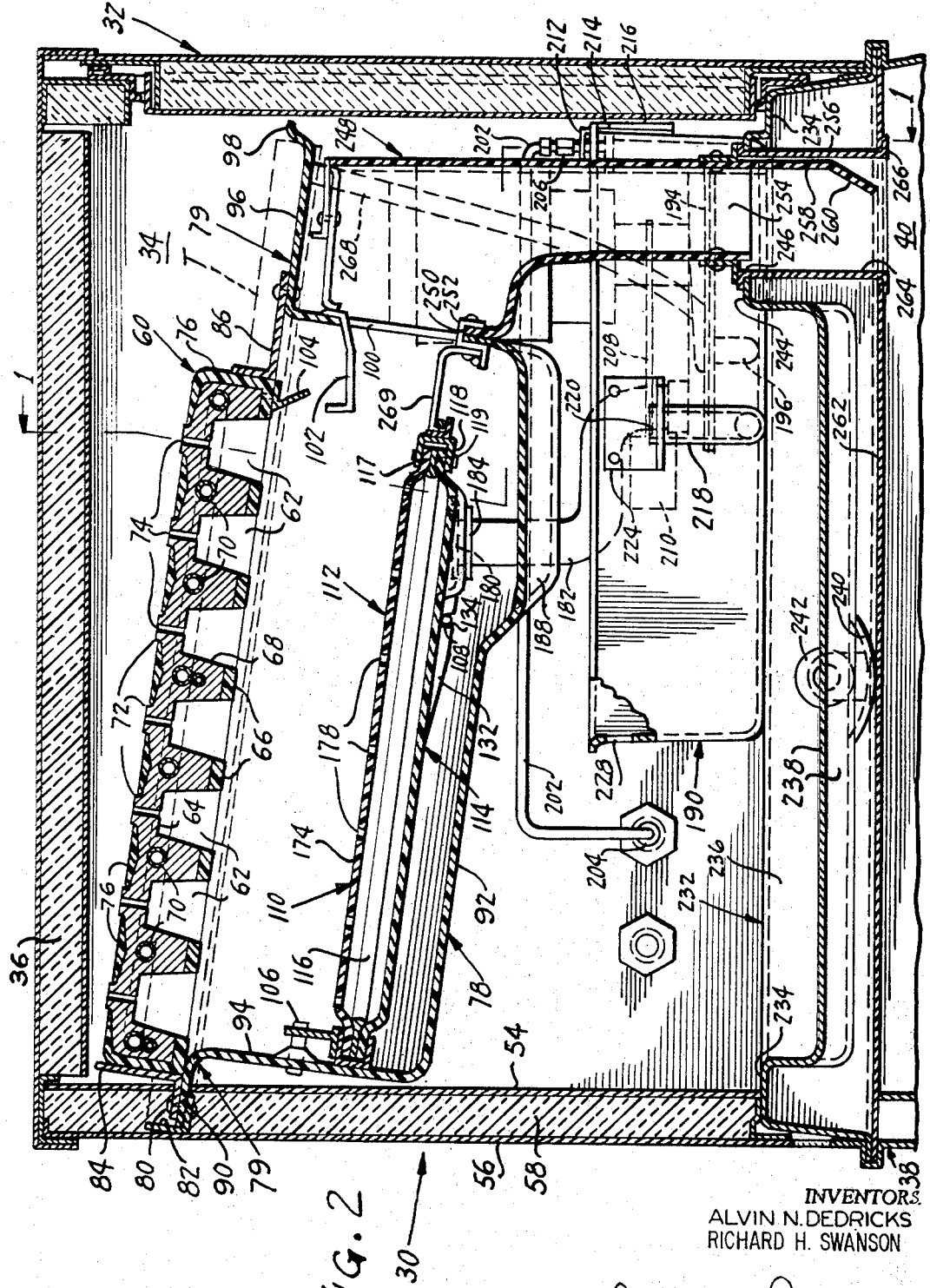

Oct. 29, 1968  A. N. DEDRICKS ETAL  3,407,621
SPRAY TYPE ICEMAKER WITH OVERFLOW DRAIN
Original Filed March 27, 1964  3 Sheets-Sheet 3

INVENTORS
ALVIN N. DEDRICKS
RICHARD H. SWANSON
BY
ATTORNEY.

United States Patent Office 3,407,621
Patented Oct. 29, 1968

3,407,621
SPRAY TYPE ICEMAKER WITH
OVERFLOW DRAIN
Alvin N. Dedricks and Richard H. Swanson, Manitowoc, Wis., assignors to The Manitowoc Company, Inc., Manitowoc, Wis., a corporation of Wisconsin
Original application Mar. 27, 1964, Ser. No. 355,302, now Patent No. 3,289,430, dated Dec. 6, 1966. Divided and this application Dec. 5, 1966, Ser. No. 599,314
5 Claims. (Cl. 62—188)

ABSTRACT OF THE DISCLOSURE

This disclosure describes a method, system and apparatus for making frozen products wherein a liquid starting material is applied to a freezing mold or the like with only part of the liquid material being frozen thereon. The excess unfrozen liquid material is collected in a receptacle. A relatively impure part of liquid material in the receptacle is removed from the lower portion of the receptacle. The quantity of liquid material removed is less than substantially all of the liquid in the receptacle. Several arrangements are disclosed to carry out this operation.

---

This invention relates generally to a machine or apparatus for making and storing relatively small chunks of ice of uniform shape and size, preferably of the type known generally as "ice cubes."

This is a restricted or divisional application of Ser. No. 355,302, filed Mar. 27, 1964, entitled Spray Type Ice Cube Making Machine, now United States Letters Patent No. 3,289,430, issued Dec. 6, 1966.

More particularly, the present invention pertains to a machine or apparatus employing a system for continuously and automatically making and storing substantial quantities of high-quality ice cubes.

There is currently being formulated, by the National Sanitation Foundation, standards of cleanliness relating to automatic frozen food product making machinery or apparatus, to which manufacturers must conform in order to obtain a seal of approval from the foundation. Included in these standards are requirements such as the accessibility of the parts or components of the apparatus for proper and thorough cleaning and visual inspection, and the removability of the parts or components from the main apparatus without the use of tools or with the use of only simple tools.

The primary objects of the present inventive concept are more fully, precisely and clearly set forth in the specification of the present application, identified above, and reference thereto may be had for a more detailed disclosure and description of the objects of the instant inventive concept.

An object of the invention is the provision of a machine, system or apparatus for making ice blocks in cube or other desired shapes wherein readily removable mold and water manifold structures are supported by a housing assembly which is so constituted and disposed as to direct excess water from the mold to a readily removable, statically positioned sump for recirculation.

Another object of the present invention is the provision of such a machine, system or apparatus for making ice blocks in cube or other desired shapes wherein water is maintained at a predetermined level in a sump by a float controlled device, the sump also having a device for flushing only a portion of the water therein from the bottom portion thereof to remove mineral and other impurities contained in the water with only a minimum loss of the chilled water contained therein.

A further object of this invention is to provide in such a machine, system or apparatus for making a plurality of relatively small cube-like blocks of ice, an assembly for periodically flushing therefrom a minimum amount of water with each ice cube making cycle wherein any impurities that accumulate in the water will be removed with each flushing to secure crystalline clear ice cubes and to increase the ice cube making efficiency by conserving a maximum amount of the water used.

An additional object of the present invention to provide in a machine, system or apparatus for producing substantially crystalline clear ice cubes and having a water sump reservoir, a novel device for controlling the periodic flushing from the bottom portion of the sump or reservoir only the water contained in the lowest part thereof which contains the water-carried impurities if any are present, thereby to conserve and retain a maximum amount of the excess water from each cycle which was chilled, but not frozen during the ice cube making process.

Still another object of the instant invention is to provide a mechanism, system or apparatus for making substantially pure ice in cube or equivalent form having a device which is so constructed and arranged as to utilize excess chilled water from the ice cube making process to precool incoming water and thus to increase the efficiency of the ice cube making process.

Yet another object of this invention is to provide in an ice cube making machine, system or apparatus, such a precooling device having a novel valve assembly to control the discharge therefrom of excess chilled water flowing therein after each ice cube making process or cycle.

A further object of the instant invention is to provide an apparatus for making and periodically dispensing a frozen product in which the incoming liquid starting material is temporarily stored in a sump within a cooled part of the apparatus to precool the liquid starting material.

A still further object of the instant invention is to provide a method for making a frozen product of high purity from a liquid starting material of lesser purity which comprises removing a portion of relatively impure liquid material.

Another object of the instant invention is to provide a method of making a frozen product of high purity from a liquid starting material of lesser purity which comprises freezing a portion of the liquid material, collecting the unfrozen portion of the liquid material and periodically removing a portion of the relatively impure liquid material.

Still another object of the instant invention is to provide a method of making a frozen product of high purity from a liquid which comprises freezing a portion of the liquid material in cycles, collecting the unfrozen relatively impure liquid material and removing a portion of the relatively impure liquid between freezing cycles.

Other objects, advantages and important features of this invention will be apparent from a study of the specification following, taken with the drawing which together describe, disclose, illustrate, and show certain embodiments or modifications of machinery or apparatus which define the component parts of a system which employs a novel method or process for making substantially pure ice in cube or comparable shapes and what is now considered and believed to be the best method of practicing the procedures and principles thereof. Still other embodiments, modifications, procedures, or equivalents thereof may be suggested to those having the benefit of the teachings herein, and such other embodiments, modifications, procedures, or equivalents are intended to be reserved to the applicant especially as they fall within the scope and breadth of the subjoined claims.

In the drawing:

FIGURE 2 is a vertical sectional view taken substantially along the line 2—2 of FIGURE 1;

Figure 1:
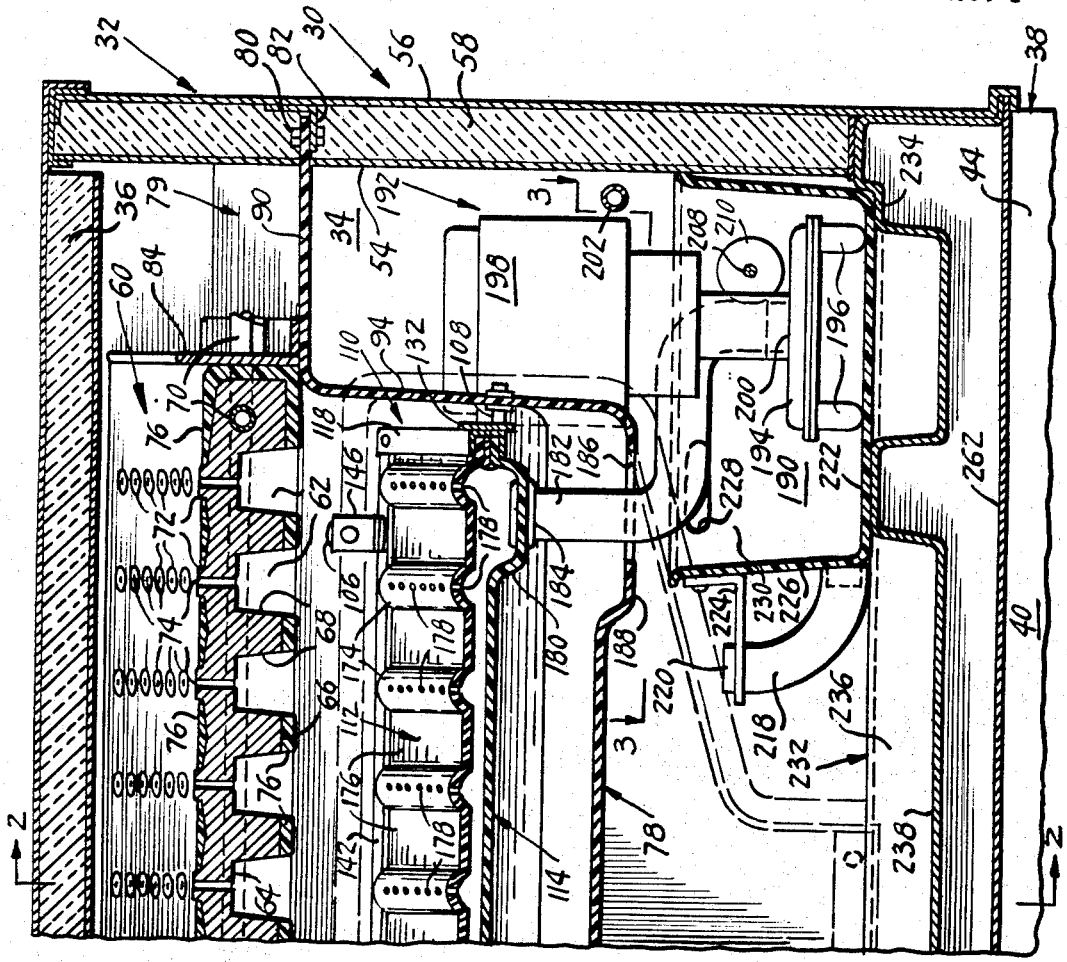
FIGURE 1 is a vertical sectional view showing various details of a mold, water manifold, and sump structure of the present icemaking machine, system or apparatus.
Figure 3:
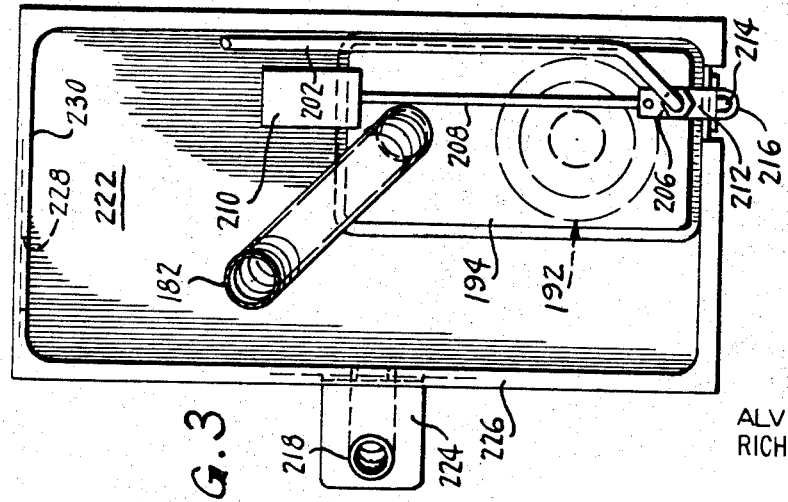
FIGURE 3 is a horizontal sectional view taken substantially along line 3—3 of FIGURE 1 to clearly show details of the water supply component of the instant apparatus and the control features therefor.

With reference now to the drawing, there is illustrated in FIGURES 1 and 2 an ice machine enclosure or cabinet 30 having an upper section 32 which provides a chamber 34 in which is mounted an ice cube making unit, mechanism or apparatus. The chamber 34 is closed by an easily removable upper closure member or cover 36. Below the upper cabinet section 32 is a lower section 38. The upper portion of the lower section 38 comprises an ice bin 40 which receives the ice cubes from the ice cube making chamber 34, the front of the ice bin 40 being closed by access doors for the removal of ice cubes therefrom when desired.

All outer wall portions of the cabinet 30, together with its upper closure member 36 and its ice cube access doors, are preferably of hollow construction, comprising in each instance an inner wall 54 parallelly spaced from an outer wall 56, with suitable insulation material 58 filling the space therebetween.

With particular reference to FIGURES 1 and 2, the ice cube making chamber 34 of the upper cabinet section 32 has fixedly mounted therein a freezing mold or platen 60. The freezing mold 60 comprises a plurality of freezing cells or cups 62 formed therein. Each of the cells 62 preferably has a top wall 64 lying substantially parallel to a bottom wall 66 of the mold 60 and downwardly diverging side walls 68. Refrigerant or evaporator tubes 70 are initially cast in the mold 60 or are securely fastened to the back surface thereof.

Each of the upper walls 64 of the freezing cells 62 may be thickened at its midsection to form an elongate ridge 72 at the upper or outer side thereof, as shown in FIGURE 2. Extending through this thickened portion between the ridge 72 and the center of the upper wall 64 of each cell 62 is a relatively restricted duct or channel 74. The freezing mold 60 is insulated by suitable insulation 76 mounted on its lower portion between the freezing cells 62, on its side portions and on its upper wall portion intermediate the ridges 72.

The freezing mold 60 may be removably mounted and frictionally held in the cabinet chamber 34 by a water discharge or spray housing 78 which is provided with a laterally extending flange portion 79 that is secured by any desired means, such as bolts 80 or the like, to brackets 82 welded or otherwise secured to the outer walls 56 of the cabinet section 32 (see FIGURES 1 and 2). Frictional clamping and positioning brackets 84 and 86 for the freezing mold 60 are removably secured in any suitable manner on the flange portion 79 of the spray housing 78.

A portion 90 of the flange 79 extends around approximately three sides of the spray housing 78 to underlie and support the freezing mold 60. The lower wall 92 of the spray housing 78 is spaced a substantial distance below the mold 60 and is integral with the upwardly extending side walls 94 of the spray housing 78.

A portion 96 of the spray housing flange 79, provided on approximately one side of the spray housing 78, as shown in FIGURE 2, is provided with a raised edge or rim 98 to form a water collecting tray T for any water flowing down from the freezing mold 60. The side wall 94 of the spray housing 78 adjacent the flange portion 96 is apertured at 100 throughout its transverse width corresponding to the width of the mold 60. Secured in any suitable manner to the housing wall 94 adjacent the upper edge of the aperture 100 therein is a water receiving tray 102. The tray 102 extends through the aperture 100 to a point underlying a water splash deflector strip or plate 104 which is secured to the underside of the freezing mold 60 in any suitable manner.

The spray housing 78 has suitably secured on its interior side walls 94 a series of spaced lug members 106 and 108 which removably support a water manifold or fountain field structure 110.

As shown in FIGURES 1 and 2, the water manifold structure 110 comprises two coextensive and parallel, upper and lower, cupped or disked plate-like members 112 and 114. A flexible and resilient sealing gland or gasket 116 is interposed between the plate members 112 and 114 of the manifold 110 and is in contact with the peripheral rim portions 117 and 119, respectively, thereof. The peripheral rim portions 117 and 119 of the manifold plates 112 and 114, respectively, are frictionally held together in sealing engagement with the sealing gasket 116 by brackets 118 having laterally extending legs portions. The legs portions of the brackets 118 are maintained in tight engagement with the upper and lower manifold plates 112 and 114, respectively, by suitable securing means. The upstanding leg portion on each of the brackets 118 is provided with a plate member 132 rigidly secured thereto in any suitable manner. The plate members 132 are each provided with a downwardly extending slot 134 which is adapted to receive therein the adjacent lug 108 on the spray housing 78 in order to removably mount the water manifold 110 on the spray housing 78 (see FIGURE 2).

The upper plate-like member 112 of the water manifold 110, as clearly shown in FIGURE 1, is generally corrugated in section and is provided with raised, curved portions 174 and flat, depressed portions 176. Each raised portion 174 has a plurality of equally spaced water ejection ducts 178 therein which, owing to the thickness of the plate member 112, are relatively elongate in section.

The bottom plate-like member 114 of the manifold 110 is formed at the lower end thereof (the right end as seen in FIGURE 1) with a locally depressed basis or well 180 to which extends a water supply pipe 182 that is slidably and detachably connected thereto by a suitable, easily removable rubber sleeve or bushing 184. The water supply pipe 182 extends downwardly through an enlarged aligned opening 186 in a depressed drain basin or well 188 in the bottom wall 92 of the spray housing 78.

If desired, reference may be had to the previously identified copending parent application now United States Letters Patent No. 3,289,430, from which the instant application has been divided or restricted in order to have a more detailed description of the various components of the apparatus, system or machine being herein described and disclosed.

However, it is to be understood that the relative disposition, composition, relationship, etc., of the various components of the machine, system or apparatus may vary some and be different than that as disclosed in United States Letters Patent No. 3,289,430 since the instant inventive concept is limited to that part of the parent application which has been divided or restricted therefrom. For example, there is no reason why the instant inventive concept cannot be effective and have application with other types of machines, systems or apparatus other than that which has been specifically described and positively disclosed in the parent application and attention is directed to an application No. 599,234 for United States Letters Patent, entitled Ice Cube Making Apparatus, filed Dec. 5, 1966.

Disposed directly below the enlarged opening 186 in the spray housing well 188 is a flat-bottomed water sump or reservoir 190 of relatively small transverse area relative to the cabinet chamber 34, as is apparent from FIGURES 1 and 2. The sump 190 preferably is formed of a suitable plastic material. Removably mounted in the sump 190 is a unitary pump and motor unit 192 comprising a pump 194, vertically spaced from the bottom of the sump 190 on legs 196 and a motor 198, preferably of the electric type, which is positioned directly over the pump 194 and suitably connected in driving relation thereto. The motor 198 is thermostatically responsive, by means not shown, to the temperature of the water in the freezing mold cells 62, in a manner to be described hereinafter.

The water supply pipe 182 connects at the lower end thereof with the water discharge end 200 of the water pump 194. A water feed pipe or conduit 202 enters the cabinet chamber 34 at 204 and connects with the sump 190 through a valve 206 which is controlled by a pivoted arm 208 having a float 210 adjustably mounted thereon at its free end disposed within the sump 190. The valve 206 is readily disconnectible from the water feed pipe 202 and is removably supported on the upper portion of one side of the sump 190 by a horizontally positioned plate member 212 thereon having a vertical pin 214 slidably and snugly received in a stirrup bracket 216 fixedly secured on the sump 190 (see FIGURE 2).

As clearly shown in FIGURE 1, a generally upstanding overflow pipe 218 having a top edge 220 is connected to the sump 190 adjacent its bottom wall portion 222 and is held rigidly in position by a brace member 224 attached to the side wall 226 of the sump 190. An overflow opening 228 is provided in the side wall 230 of the sump 190 near the upper portion thereof and is spaced a predetermined, but relatively short, distance above the top edge 220 of the overflow pipe 218 for a reason which will be apparent from the description hereinafter.

The chamber 34 of the upper cabinet section 32, which is positioned directly over the ice bin 40 of the lower cabinet section 38, has a bottom hollow or double-walled structure forming a partition 232 between the two cabinet sections 32 and 38 (see FIGURES 1 and 2). The upper portion of the partition 232 has a flat, substantially horizontal peripheral wall portion 234 on which is supported the sump 190, and a major depressed central drain area 236 having a lower wall 238 sloping downwardly towards one end thereof. The drain area 236 has a well or depression 240 therein to which is connected a sewer drain connection 242. At one end of the partition 232 (the right end as shown in FIGURE 2), an elevated or raised horizontal section 244 is provided which connects the peripheral wall 234 of the partition 232 with the central depressed drain area 236. The horizontal section 244 of the partition 232 is provided with a vertical opening 246 which serves a purpose to be later described. The sump 190 is removably supported on and frictionally held in position on the flat peripheral wall 234 of the partition 232 solely by its own weight and the weight of its contents, such as the pump and motor unit 192 and the water contained therein.

Secured to one end of the water spray housing 78 is a downwardly extending, vertically disposed ice cube exit chute structure 248 (see FIGURE 2) having an upper, elongated entry port 250 of a width corresponding to the width of the freezing mold 60. The exit chute structure 248 is rigidly secured in any suitable manner, such as by an angle bracket or brackets 252, to the spray housing 78 in a manner to align the entry port 250 thereof with the adjacent end opening 100 in the spray housing 78. The lower end 254 of the ice cube chute structure 248 has an adapted sleeve 256 secured thereon which is snugly received in the vertical opening 246 of the raised horizontal section 244 of the partition 232. The outer wall portion 258 of the lower ice chute end 254 is extended to the lower end of the adapter sleeve 256 and is bent inwardly to form an ice cube deflector surface 260. The lower wall portion 262 of the bottom, double-walled partition 232 of chamber 34 is generally horizontally flat and seats on the upper edges of the side walls of the lower cabinet section 38 forming the ice bin 40. An opening 264 formed in the lower wall portion 262 snugly receives the lower end of the adapter sleeve 256 therethrough, the latter being flanged at 266 and secured to the lower wall portion 262 in any suitable manner.

As shown in FIGURE 2, a drain tube 268 connects to the water collecting tray T formed on the upper portion 96 of the spray housing 78 to conduct any water therein to the central drain area 236 in the lower portion of the cabinet section 32 and alongside of the sump 190.

Also illustrated in FIGURE 2 is a bridging wire grid 269 which extends across and is removably and frictionally secured in any suitable manner, such as on the curved plate sections 252, between the lower end of the manifold 110 and the lower edge of the end opening 100 in the spray housing 78 to form a connecting path or support structure therebetween which serves a purpose to be described hereinafter.

Figure 6:
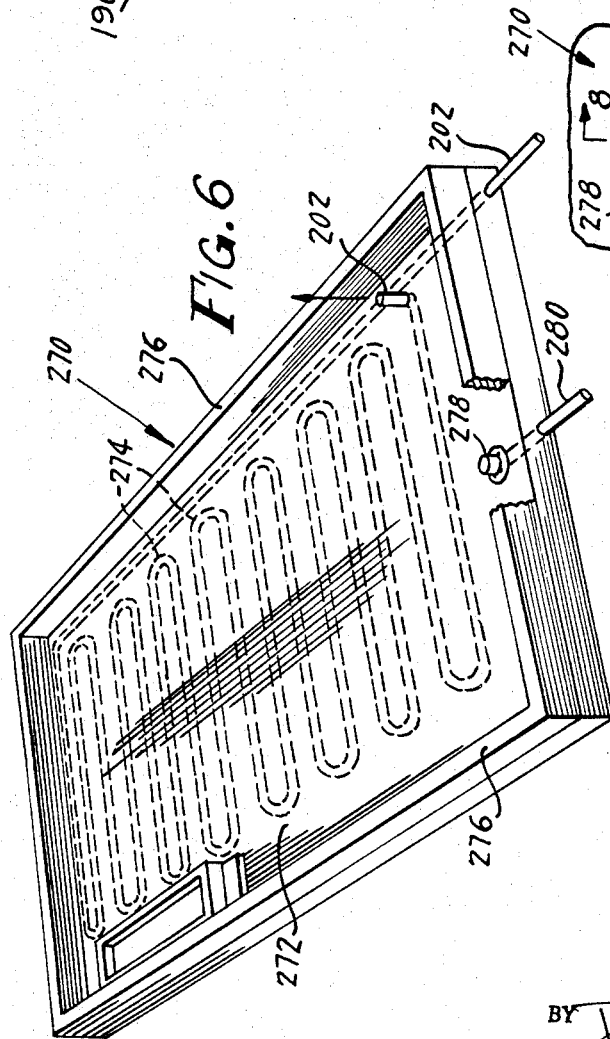
FIGURE 6 is a perspective view of a tray or receptacle which may be incorporated into the instant ice cube making machine, system or apparatus to receive excess cooled water therein from the freezing mold for precooling incoming water passing therethrough.

FIGURE 6 shows a water regenerative or precooling receptacle or tray 270 formed of a suitable heat conducting plastic or metallic material, which may be utilized with the instant ice cube making machine or apparatus in its preferred or modified forms. The tray 270 preferably replaces the double-walled partition 232 at the bottom of chamber 34 and supports the sump 190 in a manner to receive excess cooled water from the overflow pipe 218 thereof in a manner to be described. Of course, the regenerative tray 270 may be positioned at any convenient position within cabinet 30 to receive overflow from sump 190.

The tray 270 comprises a wall 272 corresponding to wall 238 of partition 232 below which there is disposed a cooling coil 274, one end of which is connected to the water feed pipe 202 entering the chamber 34 at 204 and the other end of which preferably is connected to the balance of the water feed pipe 202 extending to the float-controlled valve 206. A raised wall 276 surrounds the tray 270 to retain therein the excess cooled water entering the tray from the spray housing 78. This cooled water functions to precool the incoming water in the water feed pipe 202 as it passes through the cooling coil 274 in the base 272 of the tray 270, thereby increasing the effciency of the instant ice cube making mechanism or apparatus.

Figure 7:
FIGURE 7 is an enlarged fragmentary plan view of a control valve provided in the base of the precooling tray shown in FIGURE 6.
Figure 8:
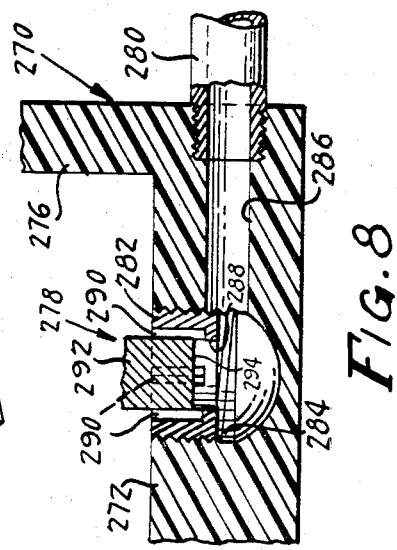
FIGURE 8 is a longitudinal sectional view taken substantially along the line 8—8 of FIGURE 7.

As shown in FIGURES 6 through 8, the regenerative tray 270 preferably is provided with a drain valve 278 which allows the excess cooled water to gradually drain from the tray 270 through a conduit 280 at a rate which will maintain the level of the excess water in the tray 270 below the upper surface of the raised wall 276 to prevent overflowing and to allow for a fresh supply of cooled water from the spray housing 78. The drain valve 278 comprises an externally threaded, generally cylindrical hollow valve member 282 which is threaded into an opening 284 in the base 272 of the tray 270 which is in communication with a bore 286 leading to the drain conduit 280. The interior surface 288 of the valve member 282 is radially relieved or enlarged at spaced intervals therearound to form drain channels 290 therein. A solid, generally circular plug 292 is disposed within the valve member 282 and is in frictional engagement with the interior surface 288 thereof, the bottom 294 of the plug 292 being disposed above the termination of the drain channels 290 adjacent the bottom portion of the valve member 282. The excess, cooled water in the tray 270 may thus drain through the channels 290 in the valve member 282 past the plug 292 and into the conduit 280 at a predetermined rate determined by the depth of the plug 292 in the valve member 282.

Outlet conduit 280, tray 270 and inlet conduit 202 are connected to the remainder of the water handling system of the instant invention in order to accomplish various purposes. To minimize heat losses, tray 270 is positioned to receive the overflow from pipe 218 and aperture 22. To minimize impurities in the water handling system, tray 270 may be positioned to receive overflow from pipe 218 with aperture 228 being located sufficiently above the datum plane of the end 220 of overflow pipe 218 to act merely as a safety device in the event that influx into the sump 190 exceeds the capacity of the overflow pipe 218. Since the outlet conduit 280 is connected to the sewer connection 242 the impure water overflowing from the overflow pipe 218 and acting as a coolant for incoming water through the pipe 202 will gradually be expelled from the system.

While the regenerative tray 270 has been disclosed herein as a modification of the instant ice cube making mechanism or apparatus disclosed specifically in FIGURES 1 and 2, for the purpose of simplifying these figures, it is noted that the regenerative tray 270 is considered to be a preferred modification of the instant apparatus, since it results in the increased efficiency thereof.

Before describing the operation of the instant apparatus, it will be assumed that initially the sump 190 is filled with water to a level corresponding to that of the top edge 220 of its overflow pipe 218 (see FIGURE 1). The float 210 is initially adjusted along its pivoted arm 208 so that the arm 208 will close the valve 206 to end the flow of water into the sump 190 from the water feed pipe 202 when the level of the float 210 corresponds to the level of the upper edge 220 of the overflow pipe 218. It will also be assumed that the mold cells 62 are emptied of ice cubes and that the thermostatically responsive pump motor 198 is thereby energized to actuate the pump 194 in a conventional manner, and also that refrigerant for freezing water entering the mold cells 62 is flowing in the tubes 70 extending through the mold 60.

In operation, the actuation of the pump 194 by its motor 198 forces the water contained in the sump 190 to enter the pump inlet spaced above the bottom of the sump 190 for discharge under pressure from the outlet 200 of the pump 194 through the water supply pipe 182 and then into the water manifold 110. When the water is under a predetermined pressure within a manifold 110, it is ejected upwardly through the elongated ejection ducts 178 in the raised portions 172 of the manifold plate 112 in the form of streams. Any water which tends to splash toward the ice cube chute 248 is prevented from entering the chute by impinging against the deflector plate or strip 104. The water is then deflected from the plate 104 into the water receiving tray 102 which empties at one end into the spray housing 78, the water then escaping into the sump 190 via the opening 186 in the basin 188 of the spray housing 78. As the pump 194 takes water from sump 190 to fill water supply pipe 182 and water manifold 110, the water level in sump 190 will be maintained at its normal level by the action of float 210 and float valve 206.

Since the flow of water from the ducts 178 of the water manifold 110 into the mold cup or cells 62 is of relatively low pressure and therefore gentle and solid in character, it readily freezes in the cell 62 by the freezing action of the refrigerant flowing through the evaporator pipes 70 in the mold 60. Since the presence of mineral salts dissolved in water tends to lower the freezing point thereof, only relatively pure water freezes to the walls of the cells 62 and the dissolved salts tend to be concentrated in the unfrozen water.

Any water that is ejected from the elongated manifold ducts 178 and not frozen in the mold cells 62, is chilled and prevented from freezing on the remaining exposed portions of the mold structure 60 by reason of the insulation 76 thereof and flows down onto the lower surface or wall 92 of the spray housing 78. This chilled water on the lower housing wall 92 is conducted into the depressed drain basin area 188 and escapes through the opening 186 therein into the sump 190.

When the freezing of the ice cubes in the mold cells 62 is completed, the thermostatically responsive pump motor 198 and thus the discharge of water from the pump 194 are automatically stopped. The water then standing in the water manifold 110 drains back down through the water supply pipe 182 into the pump housing via its discharge outlet 200 and then into the sump 190 via the pump inlet (not shown) spaced from the bottom 222 of the sump. This excess water causes the water level in the sump to rise above the upper edge 220 of the overflow pipe 218 whereby water from the bottom of the sump 190 will be caused to overflow through pipe 218 into the depression 240 and to the drain connection 242. Since the dissolved impurities tend to settle to the bottom of the sump, these are thus largely flushed away at the end of each cycle.

Alternatively, in a preferred embodiment of the instant device, the excess water flows from the pipe 218 into the tray 270. Since this excess water has already been cooled to near freezing, it is retained in tray 270 by valve 278 to precool the incoming water in coil 274. The flow of refrigerant in the evaporator pipe 70 within the mold 60 is then reversed for a predetermined period, by conventional means, not illustrated, to temporarily warm the mold cells 62 and to effect a slight melting of the mold-contacting surfaces of the ice cubes formed therein to free them by gravity from the mold cell 62. By reason of the ducts or air vent apertures 74 air pressure is let into the respective mold cells 62 so that any vacuum effect which may be created therein is broken so that the newly formed ice cubes then fall from the mold cells 62 by gravity onto the inclined curved and flat portions 174 and 176, respectively, of the upper plate 112 of the freezing mold 60 and are guided thereby to slide downwardly therealong, also by gravity, over the wire grid 269 and through the opening 100 in the spray housing 78 into the ice chute 248. The ice cubes then pass by gravity down through the chute 248 and through the adapter sleeves 256 into the ice cube storage bin 40. Meanwhile, as soon as the mold cells 62 are emptied of the formed ice cubes, the flow of refrigerant pipes 70 is automatically returned to normal, by conventional control means (not shown), to again effect freezing of the water entering the mold cells 62. The thermostatically responsive pump motor 198 is likewise again energized to repeat the mold cell filling and freezing cycle just described.

As has heretofore been emphasized, it is important that all of the various component elements of the instant ice cube making apparatus be readily accessible and easily removable from the cabinet section 32 by hand or without the need of special tools for cleaning or for any other purpose. This is exceedingly important since normally special solutions are required, for example, in cleaning the sump pump 194 and motor 198 thereof. By having the pump and motor unit 192 so easily removable, such solutions are prevented from being circulated throughout the entire ice cube making system of the instant apparatus. Under these conditions, it is thus unnecessary to remove the ice cubes from the storage bin 40 when the pump 194 and motor 198 are to be cleaned.

The manner in which the mold structure 60 and the manifold 110 are removed from the apparatus, machine or system is more fully described and disclosed in United States Letters Patent 3,289,430 and if desired, reference may be had thereto for a description of such removal and reassembly.

To remove the pump and motor unit 192 from the sump 190 merely requires the manual removal of the slidably mounted control valve 206 from its readily disconnectible slidable mounting on the stirrup bracket 216 on the side of the sump 190. The pump and motor unit 192 then is readily manually liftable out of the sump 190 after the spray housing securing bolts 80 are unscrewed and the spray housing 78 has been lifted out of the cabinet section 32. With removal of the spray housing 78 and the pump and motor unit 192, it is obvious that the sump 190 may be readily manually lifted from the cabinet section 32, since it is only frictionally held in its operative position by its own weight and the weight of its contents. The reassembly of the ice cube making components of the instant apparatus within the chamber 34 requires merely a reversal of the steps of disassembly described above.

Figure 4:
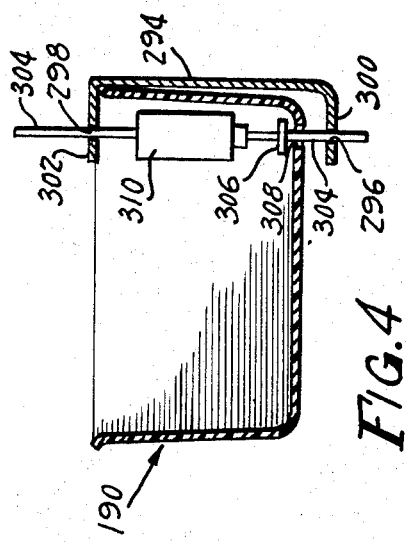
FIGURES 4 and 5 are enlarged fragmentary elevational views in section of modified arrangements for controlling the water level of the water sump to effect periodic partial drainage of the sump.

In FIGURE 4, there is illustrated a modified form of control mechanism for controlling the periodic limited discharge of water and settled impurities contained therein from the bottom of the sump 190, usable in lieu of the overflow pipe 218 of the above-described preferred embodiment of FIGURES 1 and 2. The modified control mechanism of FIGURE 4 comprises a vertically positioned, U-shaped bracket member 294 suitably secured on the side of the sump 190 and having vertically aligned apertures 296 and 298 in the respective end flanges 300 and 302 thereof which underlie and overlie, respectively, the sump 190. A valve rod 304 having a suitable valve member 306 secured thereto near its lower end is slidable in the flange apertures 296 and 298, the valve member 306 being adapted to seat over and close the discharge apertures 308 in the bottom of the sump 190. A float 310 is secured above the valve member 306 on a portion of the valve rod 304 disposed within the sump 190. The position of the float 310 on the rod 304 is such that the valve member 306 maintains the discharge aperture 308 closed when the sump 190 is normally filled by the float-controlled water supply valve 206 to the predetermined water level described with respect to FIGURE 1, but opens the sump discharge aperture 308 by lifting the valve member 306 when the water level exceeds the normal float controlled level as illustrated in FIGURE 1.

Figure 5:
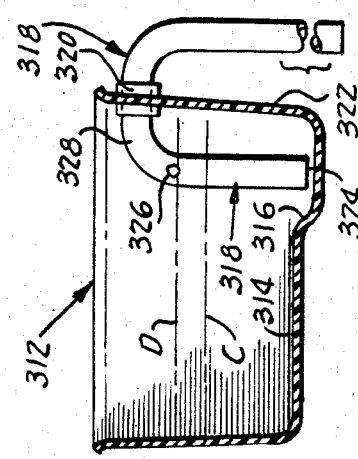

FIGURE 5 illustrates another arrangement for controlling the periodic discharge of a portion of the water and such impurities as may be contained therein from the bottom portion of a slightly modified sump 312, the flat bottom portion 314 of which has a shallow well or depression 316 at one end thereof. A U-shaped, siphon tube overflow pipe 318 is supported on mounting sleeve 320 extending through an overflow aperture in the upper portion of the end wall 322 of the sump 312 adjacent the well 316 and at a level corresponding to the normal level in FIGURE 1. The lower end 324 of the siphon pipe 318 within the sump 312 terminates closely adjacent the bottom of the well 316. A small aperture 326 is provided in the siphon pipe 318 in the upper portion thereof within the sump 312.

The lower horizontal broken line C in FIGURE 5 is indicative of the normal water in the sump as determined by the float-controlled valve 206 shown in FIGURES 1 and 2. The uppermost point 328 of the siphon pipe 318 is indicative of the overflow height of water at which the siphon pipe 318 begins to function to siphon water out of the sump 312. The upper broken line D is indicative of the level of the water at which the siphoning action of the siphon pipe 318 is stopped because of the uncovering of the aperture 326 therein as the water level lowers, permitting the entrance of air into the upper portion of the siphon pipe 318 to interrupt its siphoning action. The lower end of the siphon pipe 318 exteriorly of the sump 312 conducts the overflow discharge into the lower portion of the cabinet section 32 and into the sewer drain connection 242 as shown in FIGURE 2.

When the arrangement of FIGURE 5 is substituted in the instant ice cube making apparatus in the manner described above, the water draining back down into the sump 312 from the water manifold 110 via the water supply pipe 182 and the pump inlet (not shown), which now becomes a drain outlet from the manifold 110, raises the water level in the sump 312. As the water level rises above the siphon pipe aperture 326, the water in the sump 312 flows through the aperture 326 to fill the portion of the siphon pipe 318 thereabove. Should the water level in the sump 312 reach a level corresponding to the uppermost point 328 of the siphon pipe 318, the siphoning function of the pipe 318 automatically starts and quickly begins to lower the water level by conducting water with such impurities as may be suspended therein from the lower portion of the sump 312 and the well 316 thereof until it again uncovers the siphon pipe aperture 326 at the level D, thereby automatically interrupting the siphoning function of the pipe 318.

From the above description, it is believed that it is readily apparent that the herein disclosed ice cube making apparatus provides an apparatus having substantially no moving parts, other than the water pump 194 and the motor 198 driving it, and possesses durability, maintained effectiveness, and operating efficiency. It also provides a construction which conforms to the requirements of the National Sanitation Foundation with respect to standards of cleanliness relating to automatic frozen product making machinery or apparatus, as regards the manner in which it can readily and easily be disassembled and reassembled, and in view of the ease with which the various component parts thereof can be removed by hand or with the use of simple conventional tools for the purpose of cleaning or replacing such parts, as above explained.

While the invention has been described and disclosed in terms of several embodiments or modifications which it has assumed in actual practice, the scope of the invention should not be deemed to be limited by the precise embodiments or modifications as herein shown, illustrated, described, and disclosed, and it is to be understood that still other such embodiments or modifications are intended to be reserved, especially as they fall within the scope of the claims herein subjoined.

We claim:

1. In an ice cube making machine wherein a freezing mold receives a stream of water therein from ducts in a water manifold positioned in spaced relationship relative to the freezing mold, the combination of a sump having a pump communicating therewith, said pump being connected to said water manifold for discharging water thereto from said pump, said sump comprising a container having a flat-bottom and a drain aperture therein, means for maintaining a minimum level of water in said sump, and an overflow device connected to said sump for controlling the level of water therein between said minimum level and a predetermined maximum level, overflow device being so constituted and disposed as to drain a minimum quantity of waste water from the bottom of said sump proportional to the height between said two levels, said overflow device comprising a substantially vertical rod slidably disposed in said drain aperture, a device for guiding said rod for free vertical movement in said drain aperture, a valve member secured on said rod within said sump for closing said drain aperture, a float mounted on said rod and of a predetermined size to effect closure of said drain aperture by said valve member when the level of water in said sump approaches said minimum level, and to lift said rod and valve member thereon to open said drain aperture when the level of water in said sump approaches said maximum level, whereby mineral and other impurities contained in the water at the bottom of said sump are removed by said overflow device with a minimum loss of water to maintain maximum efficiency of said ice cube making machine.

2. In an icemaking apparatus of the type having a freezing means whereat only a portion of the water is frozen, a receptacle having a bottom wall with a drain aperture therein for collecting the unfrozen portion of the water from the freezing means, and means in communication with the receptacle for applying water therein to the freezing means, the improvement comprising means for controlling the water level in said receptacle between a minimum level and a maximum level, said water level controlling means comprising an overflow device connected to said receptacle for discharging water from said receptacle in excess of said maximum level, said overflow device being so constituted and disposed as to drain a minimum quantity of waste water from the bottom of said receptacle proportional to the height between said minimum and maximum levels, said minimum quantity of water being less than substantially all of said water in said receptacle, said overflow device comprising a substantially vertical rod mounted for free vertical movement in alignment with the drain aperture, a valve member secured to said rod within said receptacle for closing said drain aperture, and a float mounted on said rod and of a predetermined size to effect closure of said drain aperture by said valve member when a level of water in said receptacle approaches said minimum level, and to lift said rod and said valve member thereon to open said drain aperture when the level of water in said receptacle approaches said maximum level.

3. In a frozen product making machine of the type having a fluid receiving freezing mold wherein a portion of the fluid is frozen and wherefrom the remaining portion of the fluid is discharged and a receptacle disposed to receive the remaining portion of the fluid, the improvement comprising means operatively connected to said receptacle for controlling the level of the fluid therein between a minimum level and a predetermined maximum level; said means comprising fluid removal means for removing a minimum quantity of water from the bottom of said receptacle proportional to the height between said minimum and maximum levels, said quantity of water being less than substantially all of the water in said receptacle;

a container disposed in material receiving relationship with said fluid removal means, said container having a drain aperture in the lower portion thereof;

a conduit in said container in heat exchanging relationship with the contents thereof, said conduit being in material discharging relationship with said receptacle to precool fluid flowing thereinto; and a metering valve means in said drain aperture for continuously discharging fluid from said container at a generally constant rate; said metering valve means comprising a hollow valve member removably disposed in said drain aperture, the interior surface of said valve member having recessed drain channels therein; and a plug member disposed within said valve member in engagement with said interior surface thereof to enable fluid in said container to constantly drain at a predetermined rate through said drain aperture by passing through said drain channels and past said plug member.

4. In an icemaking machine of the type having a freezing mold whereat only a portion of the water is frozen in the mold and the remaining portion is discharged therefrom during the freezing of the portion frozen, the combination therewith of a sump having a drain opening for receiving the remaining portion of the water;

a pump in communication with the sump for withdrawing water therefrom and supplying same to the freezing mold;

level sensitive means interconnected with the sump for maintaining a minimum level of liquid therein; and overflow means interconnected with the sump for controlling a maximum level therein, a said overflow means communicating with the bottom portion of the sump for draining a minimum quantity of waste water constituting less than substantially all of the water in said sump from the bottom thereof proportional to the height between the minimum and maximum levels to thereby selectively remove high mineral content water from the bottom portion of the sump, the overflow means comprising the drain opening in the sump;

a valve member for closing the drain opening; and a float connected to the valve member, said float being disposed in the sump and arranged therein for moving the valve member to open the drain opening in response to the liquid level in the sump to establish the maximum liquid level.

5. The icemaking machine of claim 4 wherein the sump comprises a flat bottom wherein the drain opening is located;

the overflow means further comprises a rod in said sump mounted for vertical movement, the valve member and float being connected to the rod.

References Cited

UNITED STATES PATENTS

| 2,691,275 | 10/1954 | Andrews | 62—348 X |
| 2,657,547 | 11/1953 | Heuser | 62—188 |
| 261,959 | 8/1882 | Schenson | 251—118 |
| 1,629,914 | 5/1927 | Haas | 251—118 |
| 1,729,484 | 9/1929 | Lee | 137—430 |
| 2,022,927 | 12/1935 | Simpson | 137—143 |
| 2,131,743 | 10/1938 | Loughridge | 137—143 X |
| 2,648,956 | 8/1953 | Fletcher et al. | 62—344 X |
| 2,656,686 | 10/1953 | Bayston | 62—347 X |
| 2,949,752 | 8/1960 | Bayston | 62—348 X |
| 3,095,005 | 6/1963 | Thompson | 137—430 |
| 3,171,266 | 3/1965 | Weiss | 62—347 |

ROBERT A. O'LEARY, *Primary Examiner.*

W. E. WAYNER, *Assistant Examiner.*